(12) United States Patent
Campbell

(10) Patent No.: US 9,879,771 B2
(45) Date of Patent: Jan. 30, 2018

(54) DRY WELL SHAFT ASSEMBLY

(71) Applicant: AMARILLO GEAR COMPANY LLC, Amarillo, TX (US)

(72) Inventor: John S. Campbell, Canyon, TX (US)

(73) Assignee: AMARILLO GEAR COMPANY LLC, Amarillo, TX (US)

( * ) Notice: Subject to any disclaimer, the term of this patent is extended or adjusted under 35 U.S.C. 154(b) by 371 days.

(21) Appl. No.: 14/671,560

(22) Filed: Mar. 27, 2015

(65) Prior Publication Data
US 2016/0281834 A1  Sep. 29, 2016

(51) Int. Cl.
*F16H 57/021* (2012.01)
*F16C 33/66* (2006.01)
*F16C 33/72* (2006.01)
*F16C 35/063* (2006.01)
*F16C 3/02* (2006.01)
(Continued)

(52) U.S. Cl.
CPC .......... *F16H 57/021* (2013.01); *F16C 3/02* (2013.01); *F16C 23/06* (2013.01); *F16C 33/6666* (2013.01); *F16C 33/723* (2013.01); *F16C 35/063* (2013.01); *F16H 1/06* (2013.01); *F16H 1/20* (2013.01); *F16H 57/0025* (2013.01); *F16H 57/023* (2013.01); *F16H 57/029* (2013.01); *F16H 57/04* (2013.01); *F16C 3/023* (2013.01); *F16C 2361/61* (2013.01)

(58) Field of Classification Search
CPC .......... F16H 57/021; F16C 3/02; F16C 23/06; F16C 33/6666; F16C 33/723; F16C 35/063
See application file for complete search history.

(56) References Cited

U.S. PATENT DOCUMENTS 1,479,304 A   1/1924  Krogh
2,398,944 A   4/1946  Kopetz
(Continued)

FOREIGN PATENT DOCUMENTS

EP   0215585 A1   3/1987
EP   0756897 A1   2/1997
WO   WO-98/22301 A2   5/1998

OTHER PUBLICATIONS

Extended European Search Report, European patent application No. 16162620.5, dated Jul. 7, 2016.

*Primary Examiner* — David M Fenstermacher
(74) *Attorney, Agent, or Firm* — Marshall, Gerstein & Borun LLP

(57) ABSTRACT

Disclosed herein are a shaft assembly having a dry well and a gearbox incorporating the shaft assembly. The shaft assembly may include a housing having an opening and a lubricant reservoir. A tubular member may be fixed in the opening and extend above a surface of lubricant that collects in the lubricant reservoir during operation. At least one sealing member may be positioned between the tubular member and an inner wall defining the opening. A solid shaft may extend through the tubular member and have an outer diameter that is smaller than an inner diameter of the tubular member, thereby defining a dry well between the solid shaft and the tubular member. A bearing mount may be arranged about the tubular member and may be removably connected to a gear associated with the solid shaft. A method of assembling a gearbox incorporating the shaft assembly is also disclosed.

23 Claims, 4 Drawing Sheets

(51) Int. Cl.
*F16C 23/06* (2006.01)
*F16H 1/06* (2006.01)
*F16H 1/20* (2006.01)
*F16H 57/00* (2012.01)
*F16H 57/023* (2012.01)
*F16H 57/029* (2012.01)
*F16H 57/04* (2010.01)

(56) References Cited

U.S. PATENT DOCUMENTS

| | | | |
|---|---|---|---|
| 2,441,446 A * | 5/1948 | Schmitter | F04D 25/02 |
| | | | 415/122.1 |
| 2,832,230 A | 4/1958 | Schmitter | |
| 2,869,384 A * | 1/1959 | Schmitter | F16H 1/203 |
| | | | 184/6.12 |
| 3,095,063 A | 6/1963 | Eskenazi | |
| 3,555,962 A * | 1/1971 | Wolf | B23B 31/26 |
| | | | 184/104.1 |
| 3,796,108 A | 3/1974 | Kime et al. | |
| 4,216,848 A * | 8/1980 | Shimodaira | B66D 5/04 |
| | | | 188/184 |
| 4,800,771 A | 1/1989 | Edwards et al. | |
| 5,053,661 A * | 10/1991 | Kitamura | F16J 15/3232 |
| | | | 277/565 |
| 5,161,431 A * | 11/1992 | Watanabe | F16H 1/16 |
| | | | 74/425 |
| 5,203,221 A * | 4/1993 | Logsdon | F16D 1/096 |
| | | | 403/370 |
| 5,842,377 A * | 12/1998 | Hutchings | F16H 1/203 |
| | | | 74/420 |
| 5,875,690 A * | 3/1999 | Cognigni | F16H 1/203 |
| | | | 74/420 |
| 5,960,671 A * | 10/1999 | Nguyen | F16H 3/001 |
| | | | 74/325 |
| 6,058,793 A * | 5/2000 | Pasley | F16H 1/20 |
| | | | 184/6.12 |
| 6,273,214 B1 * | 8/2001 | Schumacher | F16H 57/043 |
| | | | 184/6.12 |
| 6,280,138 B1 | 8/2001 | Inagi et al. | |
| 7,841,774 B2 * | 11/2010 | Thompson | F16C 19/30 |
| | | | 384/489 |
| 9,186,686 B2 * | 11/2015 | Mackel | B04B 9/04 |
| 9,360,102 B2 * | 6/2016 | Schwan | F16H 57/029 |
| 2003/0185097 A1 | 10/2003 | Engel | |
| 2014/0126976 A1 | 5/2014 | Schmid et al. | |

* cited by examiner

DRY WELL SHAFT ASSEMBLY

FIELD OF DISCLOSURE

The present disclosure relates to shaft assemblies and, more particularly, to shaft assemblies having a dry well to retain lubricant within a gearbox.

BACKGROUND

Gearboxes are used in many applications to provide speed and torque conversions from a rotating power source to another device. In some applications, such as a cooling tower fan, the gearbox may be arranged such that its output shaft extends in the downward direction towards the ground. This configuration, oftentimes referred to as an output shaft down configuration, presents challenges in retaining lubricant inside the gearbox while rotating the output shaft.

The output shaft typically is supported by one or more bearings requiring lubrication. A splash lubrication scheme, involving a liquid lubricant such as oil, is commonly used for this purpose. In such a lubrication scheme, the oil collects near the bottom of the gearbox and around the opening through which the output shaft extends. As a result, the oil can leak through the opening especially when the various sealing mechanisms begin to wear.

To address this issue, some gearboxes employ different lubrication schemes for the output shaft bearings and the other gearbox bearings. For instance, a non-splash, grease lubrication scheme may be used for the output shaft bearings, whereas a splash, oil lubrication scheme may be used for the other gearbox bearings. However, the use of two separate lubrication schemes increases the cost and complexity of the gearbox, and makes maintenance activities more cumbersome.

Another treatment for reducing leakage is to use a radial lip seal where the output shaft exits the gearbox. The radial lip seal may enable lubrication of the output shaft bearings with a splash lubrication scheme. However, the radial lip seal must directly contact the rotating output shaft. As a result, the slightest defect or wear at this interface may compromise the ability of the radial lip seal to prevent leakage, which in turn can lead to catastrophic failure. Also, friction between the radial lip seal and the output shaft may inhibit rotation of the output shaft and consequently result in power losses.

Another method of preventing leakage involves creating a dry well around the output shaft. FIG. 1 illustrates one known dry well arrangement 100. Here, the output shaft 120 is made of a hollow outer portion 122 and a solid inner portion 124, with an axial end of the hollow outer portion 122 being secured to an axial end of the solid inner portion 124 at a weld 125. The hollow outer portion 122 is supported by a bearing 130. The solid inner portion 124 extends through the hollow outer portion 122 and exits the gearbox through opening 140. A tube 150 is fixed in the opening 140 and extends into the gearbox between the hollow outer portion 122 and the solid inner portion 124. The upper end of the tube 150 is configured so that it rises above the surface of a lubricant bath 160 inside the gearbox. Accordingly, lubricant generally cannot escape the gearbox through the hollow interior of the tube 150. The tube 150 thus creates a dry well for the solid inner shaft 124, while the outer portion 122 is seated against and is guided by the bearing 130.

One downside to the conventional dry well arrangement is that the output shaft 120 must be constructed in two separate pieces (i.e., a hollow outer portion 122 and a solid inner portion 124), subsequently welded or otherwise fixed together. This two-piece construction can reduce the strength of the output shaft and increase the complexity of its assembly (e.g., welding typically is required). Furthermore, the conventional dry well arrangement lacks any sealing redundancy at the interface between the tube and the inner wall of the output shaft opening.

SUMMARY

One aspect of the present disclosure includes a shaft assembly including a housing, a lubricant reservoir within the housing, a tubular member, a solid shaft, a gear, first and second bearings, and a bearing mount. The housing may have an opening and an inner wall surrounding the opening. The tubular member may have a first end fixed to the inner wall and a second end spaced from the first end to be positioned above a surface of a lubricant that collects in the lubricant reservoir during operation. The solid shaft may extend through the tubular member and have an outer diameter that is smaller than an inner diameter of the tubular member, thereby defining a dry well between the solid shaft and the tubular member. The bearing mount may be fixed to the gear and arranged about the solid shaft and may be configured to rotate together with the solid shaft. The bearing mount may be arranged about the tubular member. The bearing mount may have an outer circumferential surface that contacts the first bearing and an axial end surface that contacts the gear. In one aspect, the bearing mount may be fixed to the solid shaft.

Another aspect of the present disclosure provides a gearbox including a housing, a lubricant reservoir within the housing, a tubular member, a solid output shaft, an output gear, first and second bearings, a bearing mount, an input shaft, and an input gear. The housing may have a first opening, a second opening, and an inner wall surrounding the first opening. The tubular member may have a first end fixed to the inner wall and a second end spaced apart from the first end to be positioned above a surface of a lubricant that collects in the lubricant reservoir during operation. The solid output shaft may extend through the tubular member and have an outer diameter that is smaller than an inner diameter of the tubular member, thereby defining a dry well between the solid output shaft and the tubular member. The output gear may be arranged about the solid output shaft and may be configured to rotate together with the solid output shaft. The first and second bearings may be arranged on opposite sides of the output gear and configured to rotatably support the solid output shaft. The bearing mount may be fixed to the gear and arranged about the tubular member. The bearing mount may have an outer circumferential surface contacting the first bearing and an axial end surface contacting the output gear. The input shaft may extend into the housing through the second opening. The input gear may be arranged about the input shaft and configured to rotate together with the input shaft. Furthermore, the input gear may be operatively connected to the output gear.

Yet another aspect of the present disclosure provides a method of assembling a gearbox. The method may include: (i) providing a housing having a first opening, a second opening, an inner wall surrounding the first opening; (ii) pressing fitting a tubular member into the first opening so that an interference fit is formed between the tubular member and the inner wall surrounding the first opening; (iii) arranging a solid output shaft, an output gear, a first bearing, a second bearing, and a bearing mount inside the housing, the first and second bearings being arranged on opposite sides of the output gear, an outer circumferential surface of the bearing mount contacting an inner race of the first bearing, the tubular member being arranged about and spaced from the solid output shaft such that a dry well is defined between the tubular member and the solid output shaft; and (iv) removably fastening the bearing mount to an underside of the output gear.

DETAILED DESCRIPTION

Figure 1:
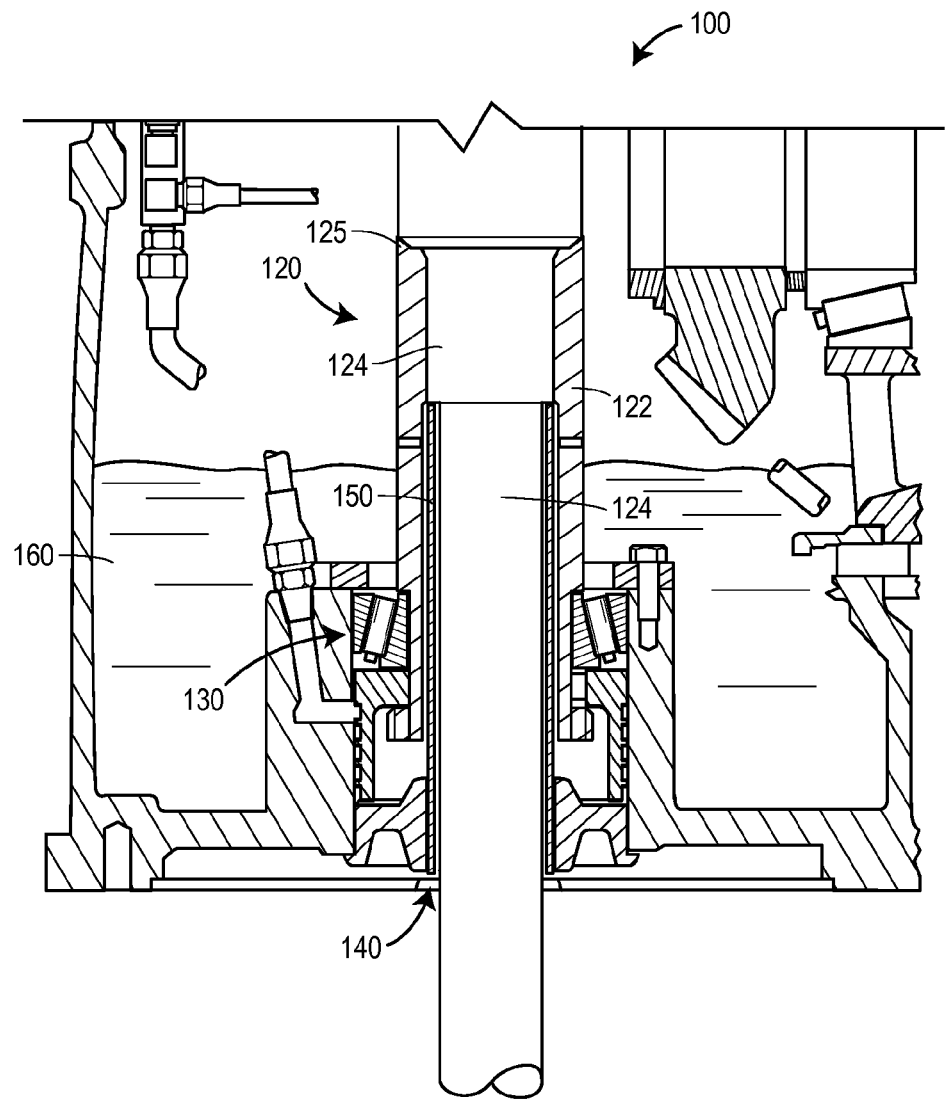
FIG. 1 is a cross-sectional view of a known dry well arrangement.

The present disclosure provides a shaft assembly having a dry well arrangement that accommodates the use of a solid (e.g., one piece, unitary, non-welded, uniform, and/or continuous) rotatable shaft. The shaft assembly may be implemented in various devices and systems having a rotatable shaft including, but not limited to, a gearbox, pump, fan, transmission, motor, or generator. The shaft assembly may include a tubular member fixed in the opening of a housing. The tubular member may surround the rotatable shaft and define a dry well between the tubular member and the rotatable shaft. The shaft assembly may also include a bearing mount that surrounds the tubular member and has an outer circumferential surface in contact with one of the bearings used to rotatably support the rotatable shaft. The bearing mount may have an axial end surface that is removably fastened to the gear associated with the rotatable shaft. The bearing mount may eliminate the need for the rotatable shaft to be constructed in two pieces, such as the hollow outer portion and the solid inner portion required by the conventional dry well arrangement illustrated in FIG. 1. Thus, instead of constructing the rotatable shaft in two pieces, the rotatable shaft may be a single, solid, unitary component. Accordingly, the shaft assembly of the present disclosure reduces the number of parts, simplifies maintenance and manufacturing, and provides a stronger shaft. Additionally, the present disclosure provides at least one sealing member between the tubular member and an inner wall defining the opening in the housing. The sealing member may provide redundancy in the seal formed by press fitting the tubular member into the opening.

Each of the foregoing components of the shaft assembly will now be described in more detail.

Figure 2:
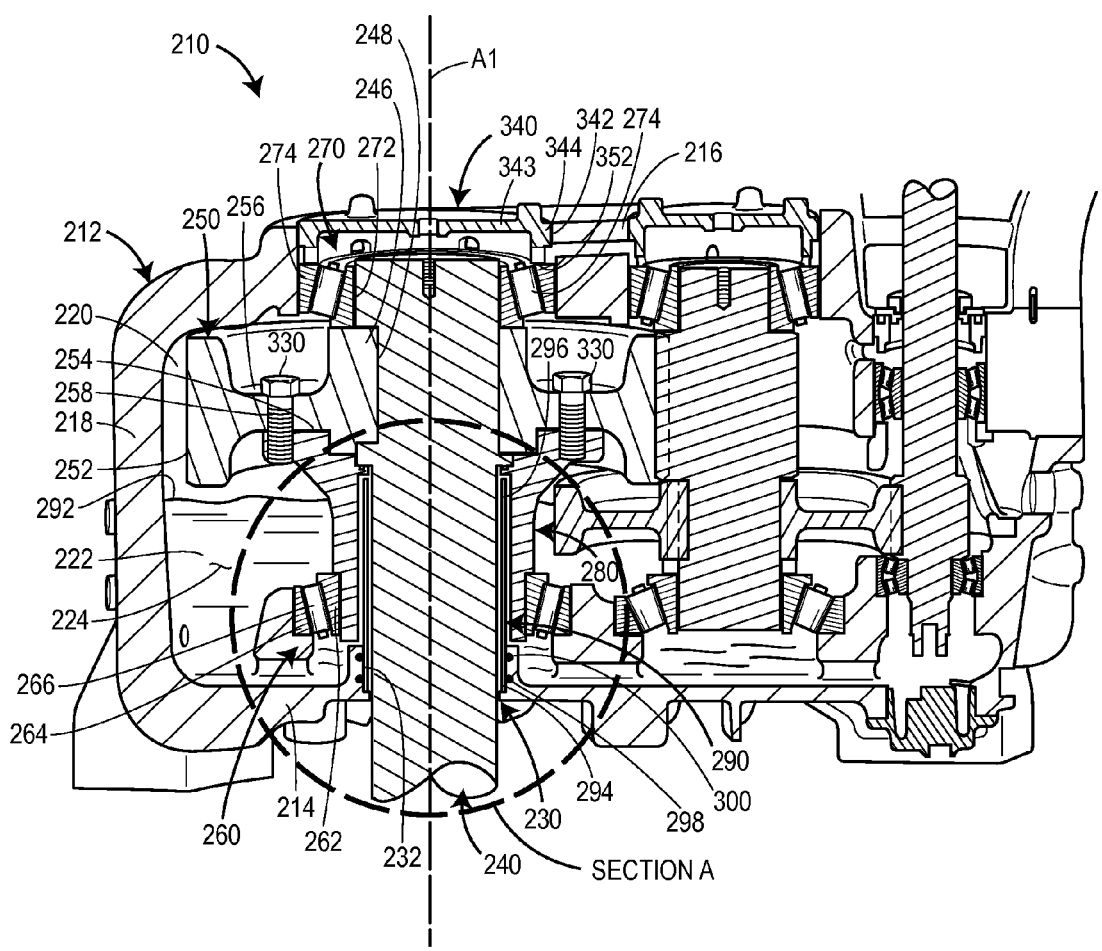
FIG. 2 is a cross-sectional view of one embodiment of a shaft assembly constructed in accordance with principles of the present disclosure.

FIG. 2 depicts a cross-sectional view of one embodiment of a shaft assembly 210 configured in accordance with principles of the present disclosure. The shaft assembly 210 may include a housing 212 having a bottom 214, a top 216, and one or more lateral sides 218 extending therebetween. The housing 212 encloses and defines an interior cavity 220. A portion of the interior cavity 220 may correspond to a lubricant reservoir 222 that collects lubricant 224 during operation of the shaft assembly 210. The lubricant 224 may be a viscous fluid such as oil. The lubricant 224 may collect, under the pull of gravity, near the bottom 214 of the housing 212, as illustrated in FIG. 2. In one embodiment, the lubricant 224 is used in a splash lubrication scheme to lubricate various components of the shaft assembly 210, as discussed below in more detail.

In use, the housing 212 may be oriented in an upright configuration such that an exterior surface of the bottom 214 faces in the downward vertical direction and an exterior surface of the top 216 faces in the upward vertical direction. Such an upright configuration is illustrated in FIG. 2. However, the housing 212 may be oriented in any desired configuration based on operational and/or design considerations.

An opening 230 may be formed in the bottom 214 of the housing 212. The opening 230 may be surrounded by an inner wall 232 having an annular shape. The inner wall 232 may be an integral portion of the bottom 214 and may extend into the housing 212 as illustrated in FIG. 2. Annular grooves may be formed in the inner wall 232 for holding respective sealing members as discussed below. One end of the inner wall 232 may have a radially inwardly extending annular protrusion 233 (see FIG. 3) that contacts and provides a stop for the second axial end 296 of the tube 290 discussed below.

The shaft assembly 210 may include a solid shaft 240 that extends through the opening 230. The solid shaft 240 may be formed in one piece from a single, unitary structure, and may be free of any welds. The solid shaft 240 may constitute an output shaft of the gearbox and provide rotational power for a driven component (not illustrated) such as a cooling tower fan or a pump. The driven component may be attached to the portion of the solid shaft 240 located outside of the housing 212. A rotational axis A1 of the solid shaft 240 may be parallel to the vertical direction, and perpendicular to a plane defining the bottom 214 of the housing 212.

A gear 250 may be arranged about the solid shaft 240 and configured to rotate together with the solid shaft 240. The gear 250 and the solid shaft 240 may be separate components, and the gear 250 may be welded, splined, keyed, and/or press fitted onto the solid shaft 240 so that the gear 250 and the solid shaft 240 rotate together in unison. In the embodiment illustrated in FIGS. 2 and 3, the gear 250 is at least keyed onto the solid shaft 240 so that the two components form a key joint. The solid shaft 240 may include a keyway 246 (e.g., a radially inwardly extending protrusion) that is received by a keyseat 248 (e.g., a slot) in the solid shaft 240 to form the key joint. Alternatively, the gear 250 may be an integral portion of the solid shaft 240 such that the gear 250 and the solid shaft 240 are formed in one piece. In an embodiment where the solid shaft 240 corresponds to the output shaft of a gearbox, the gear 250 may constitute an output gear. The gear 250 may have a plurality of teeth (not illustrated) that meshingly engage the gear of another shaft assembly. The ratio of the number of teeth of the gear 250 to the number of teeth of a gear on an input shaft may determine the angular velocity of the output shaft relative to the input shaft.

The gear 250 may possess an outer circumferential surface 252, including the plurality of teeth, and first and second axial end surfaces 254, 256 which are located on opposite sides of the gear 250. The first and second axial end surfaces 254, 256 may have u-shaped cross-sections on opposite sides of the shaft 240 as illustrated in FIG. 2, or they may be substantially planar. The first axial end surface 254 may face in the downward vertical direction and the second axial end surface 256 may face in the upward vertical direction. A plurality of holes 258 may extend through the gear 250, between the first and second axial end surfaces 254, 256, for fasteners to removably connect the gear 250 to a bearing mount 280. In one embodiment, the holes 258 may have a threaded interior surface for threadably engaging threaded fasteners such as screws. Other than the holes 258, the second axial end surface 256 of the gear 250 may be free of holes. This configuration may allow particulates, water, and other contaminants to collect in the bowl-shaped structure formed by the second axial end surface 256, as seen in FIG. 2.

Positioned on opposite sides of the gear 250 are a first roller bearing 260 and a second roller bearing 270. The first and second roller bearings 260, 270 directly or indirectly rotatably support the solid shaft 240. The first roller bearing 260 may have an inner race 262, an outer race 264, and a rolling element 266 located therebetween. The inner race 262 may frictionally engage and rotate together with the bearing mount 280 during operation. The outer race 264 may be fixed to the housing 212 and remain stationary during operation. The second roller bearing 270 may include an inner race 272, an outer race 274, and a rolling element 276 located therebetween. The inner race 272 may frictionally engage an outer circumferential surface of the solid shaft 240 and rotate together with the solid shaft 240 during operation. The outer race 274 may be fixed to the housing 212 and remain stationary during operation. Any suitable type of bearing may be used for the first and second roller bearings 260, 270, including ball bearings, double tapered roller bearings, thrust bearings, and the like. Also, any number of bearings may be used to rotatably support the solid shaft 240.

In one embodiment, the lubrication scheme for lubricating the first and second roller bearings 260 and 270 may involve submerging the first roller bearing 260 in the lubricant 224 which collects in the lubricant reservoir 222 and feeding (e.g., pumping) the lubricant 224 via a conduit (not illustrated) to the second roller bearing 270. After lubricating the second roller bearing 270, the lubricant 224 may fall and/or secrete under the pull of gravity into the lubricant reservoir 222. This type of lubrication scheme may be referred to as a splash lubrication scheme.

Since the lubricant 224 collects near the bottom 214 of the housing 212 and around the opening 230, various measures are taken to prevent the lubricant 224 from leaking through the opening 230. The shaft assembly 210 may include a tube 290 that is fixed directly in the opening 230 of the housing 212 and extends into the housing 212 to a location above the surface 292 of the lubricant 224. There are no intervening structures, besides optional seals, between the tube 290 and the housing 212. In one embodiment, a first axial end 294 of tube 290 may form an interference fit with the inner wall 232 of the housing 212, and a second axial end 296 of the tube 290 may rise above the surface 292 of the lubricant 224. Accordingly, the lubricant 224 that collects in the lubricant reservoir 222 may be prevented from spilling over the top of tube 290 and leaking through the opening 230. To achieve the interference fit, an outer diameter D1 of the tube 290 may be greater than an inner diameter D2 of the opening 230. The outer diameter D1 (see, FIG. 3) of the tube 290 may be greater than the inner diameter D2 (see, FIG. 3) of the opening 230 by approximately (e.g., within typical standards of deviation for fluid tight press fits or ±0.0005 inches) 0.0005-0.010 inches, or 0.001-0.005 inches, or 0.002-0.003 inches.

The interference fit between the tube 290 and the inner wall 232 of the opening 230 helps prevent lubricant 224 from leaking through the interface between the tube 290 and the inner wall 232. To further protect against leakage, a first annular sealing member 298 and a second annular sealing member 300 may be positioned between the tube 290 and the inner wall 232. The first annular sealing member 298 may be disposed in a first annular groove 302 (see, FIG. 3) formed in the inner wall 232, and the second annular sealing member 300 may be disposed in a second annular groove 304 (see, FIG. 3) formed in the inner wall 232. The first and second annular grooves 302, 304 may prevent the first and second annular sealing members 298, 300 from being pushed into the lubricant reservoir 222 when the tube 290 is press fitted into the opening 230. In one embodiment, a single annular sealing member may be used, and in other embodiments, three or more, or even zero, sealing members may be used.

In one embodiment, the first and second annular sealing members 298, 300 may be O-rings. The O-rings may be made of an elastomeric material such as rubber (e.g., butadiene rubber, butyl rubber, chlorosulfonated polyethylene, epichlorohydrin rubber, ethylene propylene diene monomer, ethylene propylene rubber, fluoroelastomer, nitrile rubber, perfluoroelastomer, polyacrylate rubber, polychloroprene (neoprene), polyisoprene, polysulfide rubber, polytetrafluoroethylene (PTFE), sanifluor, silicone rubber, and styrene butadiene rubber) and/or a thermoplastic (e.g., thermoplastic elastomer styrenics, thermoplastic polyolefin (TPO), low-density polyethylene, high-density polyethylene, linear low-density polyethylene, thermoplastic polyurethane polyether, polyester, thermoplastic etheresterelastomers, copolyesters, thermoplastic polyamide, melt processible rubber, and thermoplastic vulcanizate). In other versions, the sealing members 298, 300 can be metal c-seals or any other sealing mechanism. The sealing members 298, 300 may be compressed when the tube 290 is press fitted into the opening 230 and consequently create additional seals between the tube 290 and the inner wall 232. Relatively inexpensive O-rings may be used for the first and second annular sealing members 298, 300, thereby making them an economic way to provide additional, and perhaps redundant, sealing protection.

Figure 3:
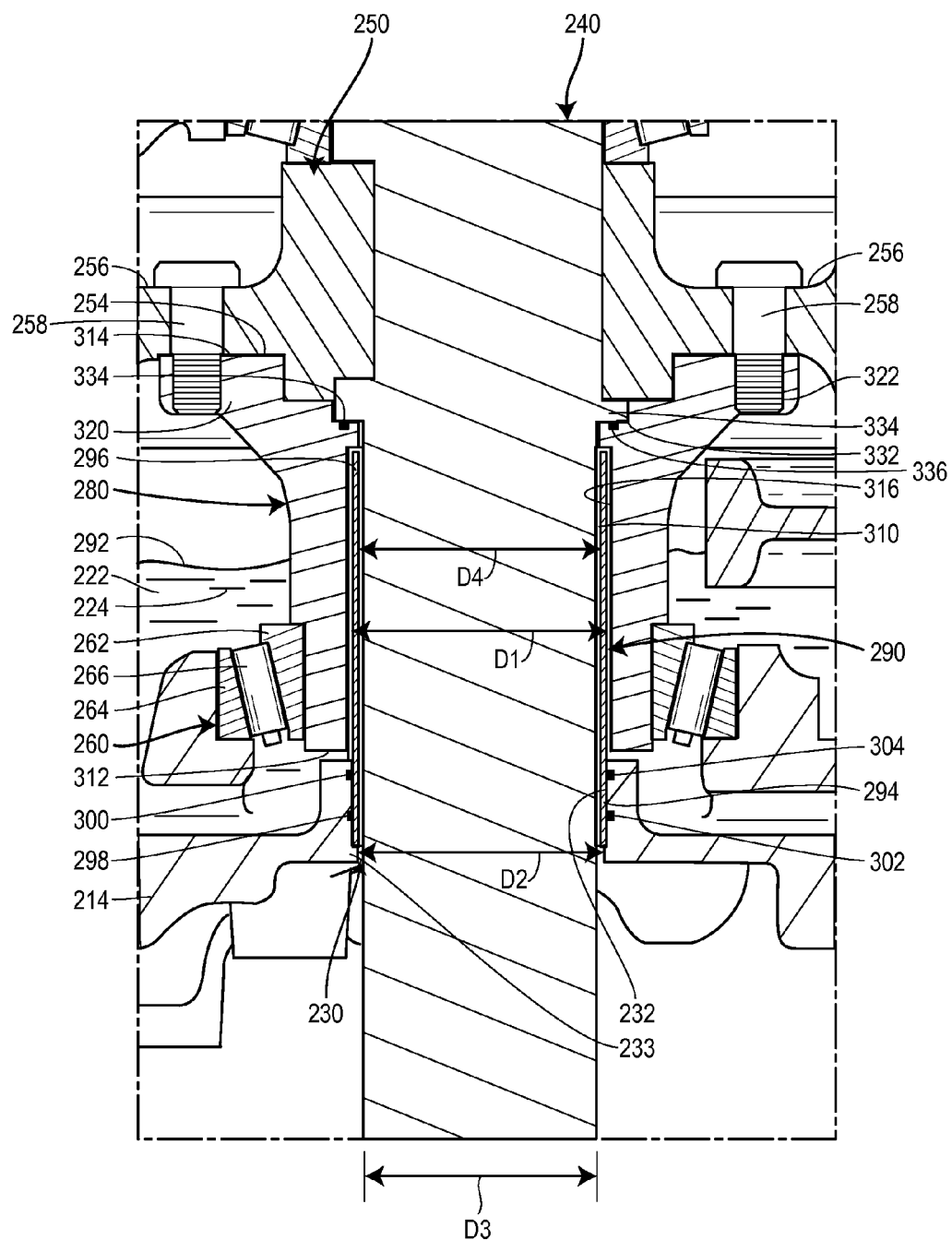
FIG. 3 is an enlarged view of Section A of the shaft assembly depicted in FIG.

Referring to FIG. 3, the tube 290 may have a hollow interior and the solid shaft 240 may extend through the hollow interior. An outer diameter D3 of the solid shaft 240 in the region of the tube 290 may be smaller than an inner diameter D4 of the tube 290 such that an annular gap 310 exists between the solid shaft 240 and the tube 290. This annular gap 310 may correspond to the dry well. Since the tube 290 extends above the surface 292 of the lubricant 224 in the lubricant reservoir 222, the lubricant 224 may be prevented from spilling over the top of the tube 290 and into the dry well. Accordingly, the tube 290 provides a means to retain the lubricant 224 within the lubricant reservoir 222 without impeding rotation of the solid shaft 240.

The tube 290 is positioned radially between the solid shaft 240 and the first roller bearing 260. This arrangement may prevent the solid shaft 240 from directly contacting the first roller bearing 260. The shaft assembly 210 therefore includes the tubular-shaped bearing mount 280 that surrounds the tube 290 and contacts the inner race 262 of the first bearing 260. The bearing mount 280 may be removably attached to the gear 250 such that rotation of the solid shaft 240 is transferred through the gear 250 to the bearing mount 280 and then to the inner race 262 of the first bearing 260. The bearing mount 280, the tube 290, and the solid shaft 240 may be concentrically arranged such that they share, and are aligned along, a common axial centerline. The bearing mount 280 and the solid shaft 240 may be separate components and may not be connected to each other in any way besides through the gear 250.

The bearing mount 280 may include a first axial end surface 312 and a second axial end surface 314 which are located on opposite sides of the bearing mount 280. The first axial end surface 312 may face in the downward vertical direction, whereas the second axial end surface 314 may face in the upward vertical direction. The second axial end surface 314 may be removably connected to, and abut, the first axial end surface 254 (i.e., the underside) of the gear 250. As illustrated in FIG. 2, the bearing mount 280 may be located entirely on one side of (e.g., below) the gear 250. The bearing mount 280 may also include an outer circumferential surface 316 that contacts the inner race 262 of the first bearing 260, and an inner circumferential surface 318 which is spaced apart from the tube 290.

To facilitate attachment of the bearing mount 280 to the gear 250, the bearing mount 280 may include a mounting flange 320 that protrudes radially outwardly from a remainder of the bearing mount 280. One side of the mounting flange 320 may be defined by the second axial end surface 314. A plurality of holes 322 may pass through the mounting flange 320 and may be aligned with the holes 258 in the gear 250. The bearing mount 280 may be removably connected to the gear 250 by inserting a plurality of fasteners 330 through the holes 258, 322, and subsequently tightening the fasteners 330. In one embodiment, the fasteners 330 may be screws or bolts, and each of the holes 258 and/or holes 322 may have a threaded interior surface that threadably engages a corresponding one of the screws or bolts.

The inner circumferential surface 318 of the bearing mount 280 may include a step-shaped shoulder 332. The solid shaft 240 may possess an annular protrusion 334 that corresponds to the step-shaped shoulder 332 as shown in FIG. 3. When the bearing mount 280 is fastened to the gear 240, the annular protrusion 334 may be clamped between the step-shaped shoulder 332 and the first axial end surface 254 of the gear 250. This configuration may help transfer the weight of the solid shaft 240, as well as the weight of the driven component (e.g., a fan) attached to the solid shaft 240, to the first roller bearing 260. In some embodiments, the step-shaped shoulder 332 may have an annular groove 334 for holding a sealing member 336 (e.g., an O-ring) that is compressed between the annular protrusion 334 and the step-shaped shoulder 332 during assembly. The sealing member 336 may help prevent oil from passing through the interface between the annular protrusion 334 and the step-shaped shoulder 332 and out of the gearbox through the dry well.

The bearing mount 280, which mounts to the gear 250, advantageously allows the first bearing 260 to rotatably support the solid shaft 240 without having to weld a hollow outer sleeve portion, or any other component, directly to the solid shaft 240. Thus, the solid shaft 240 can be made in one-piece, which not only strengthens the solid shaft, but also simplifies its assembly and maintenance. Tangentially, the bearing mount 280 accommodates the use of the tube 290 to create a dry well. Thus, the first and second roller bearings 260, 270 may be lubricated by the same splash lubrication system that is used to lubricate other components within a gearbox.

Referring back to FIG. 2, the shaft assembly 210 may further include a threaded bushing 340 sized to threadably engage a threaded opening 342 in the housing 212. The configuration and operation of the threaded bushing 340 and the threaded opening 342 may be similar to that described in the co-filed U.S. patent application entitled "DEVICE AND METHOD FOR SETTING A BEARING", which is hereby incorporated by reference in its entirety.

The threaded opening 342 may be centered over the top of the solid shaft 240. The threaded bushing 340 may be threadably advanced into the housing 212 in the downward vertical direction by rotating the threaded bushing 340 in a first rotational direction. The threaded bushing 340 may be threadably withdrawn from the housing 212 in the upward vertical direction by rotating the threaded bushing in a second rotational direction, which is opposite to the first rotational direction. The threaded bushing 340 may include a main body 343 and an axially extending annular flange 344. The main body 343 may include a threaded outer circumferential surface, and the axially extending annular flange 344 may protrude from the main body 343. An axial end surface 352 of the axially extending annular flange 348 may be configured to contact the outer race 274 of the second roller bearing 270 when the axially extending annular flange 348 is advanced into the housing 212.

The threaded bushing 340 may be used to set at least the second roller bearing 270 with a target amount of preload or clearance. The second roller bearing 270 is preloaded by rotating the threaded bushing 340 in the first rotational direction until the axial end surface 352 of the axially extending annular flange 348 contacts the outer race 274 of the second roller bearing 270. The threaded bushing 340 is then further rotated in the first rotational direction so that the outer race 274 of the second roller bearing 270 is compressed by a target amount.

To set the second roller bearing 270 with a target amount of clearance, the threaded bushing 340 is rotated in the first rotational direction until the axial end surface 352 of the axially extending annular flange 348 contacts the outer race 274 of the second roller bearing 270. Then, the threaded bushing 340 is rotated in the second rotational direction until the axial end surface 352 of the axially extending annular flange 348 is spaced apart from the outer race 274 of the second roller bearing 270 by a desired distance.

Figure 4:
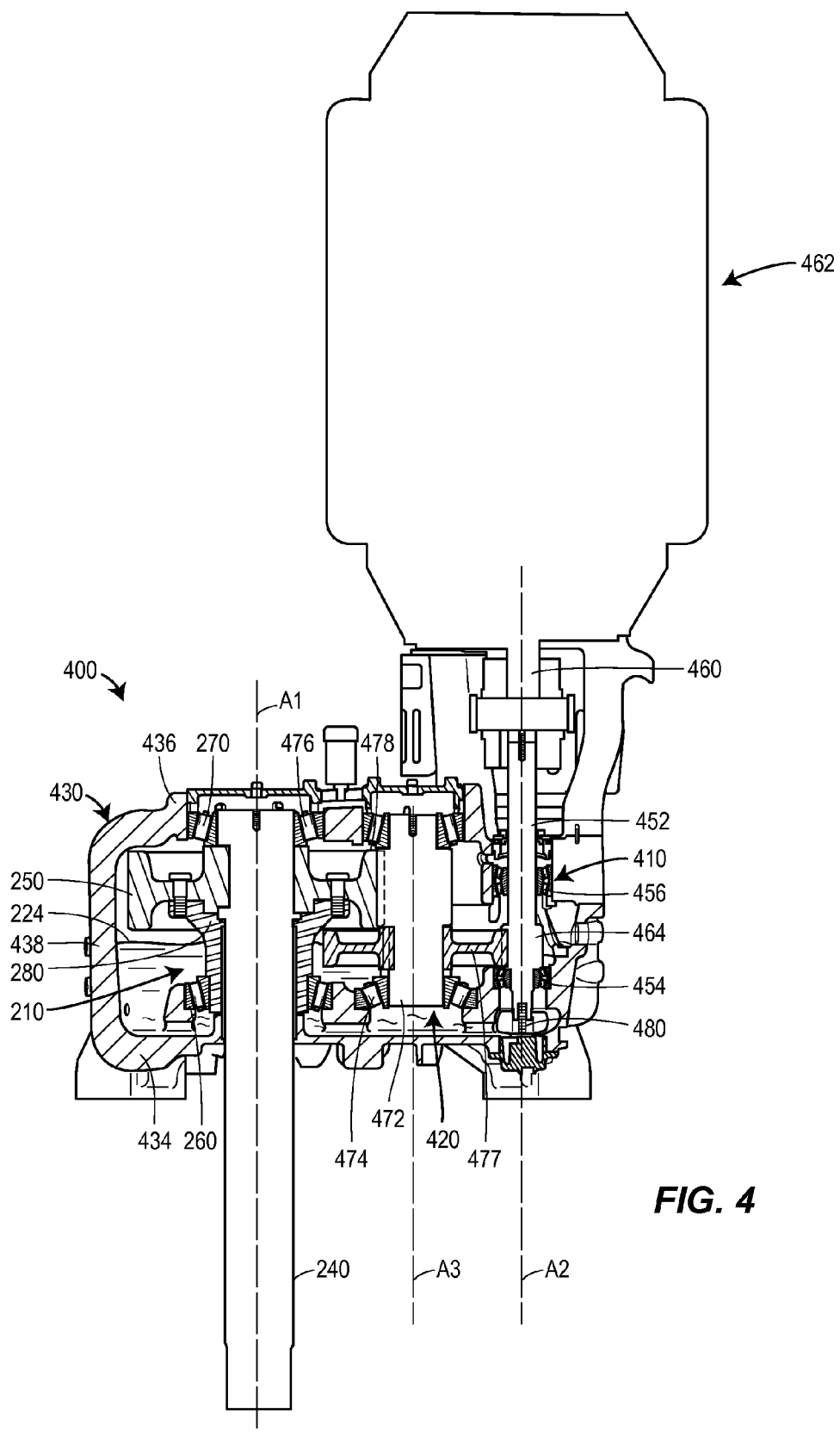
FIG. 4 is a cross-sectional view of a gearbox incorporating the shaft assembly of FIG. 2.

FIG. 4 illustrates the shaft assembly 210 implemented in a gearbox 400. The foregoing description of the shaft assembly 210 applies equally to the shaft assembly 210 included in the gearbox 400 and therefore is not repeated below. In the gearbox 400, the shaft assembly 210 may function as the output shaft assembly, such that the solid shaft 240 constitutes an output shaft and with the gear 250 constitutes an output gear. In addition to the shaft assembly 210, the gearbox may include an input shaft assembly 410 and an idler shaft assembly 420. The shaft assemblies 210, 410, and 420 may function together as a gear reduction unit that increases torque while reducing speed.

The gearbox 400 may include a housing 430 that contains the shaft assemblies 210, 410, and 420. The housing 430 may have a bottom 434, a top 436, and one or more lateral sides 438 extending therebetween. The housing 430 may enclose and define an interior cavity 440. A portion of the interior cavity 440 may correspond to a lubricant reservoir 442 that collects lubricant 444 during operation of the gearbox 400. The lubricant 444 may be a liquid such as oil. The lubricant 444 may collect, under the pull of gravity, near the bottom 434 of the housing 430. In one embodiment, the lubricant 444 may be used in a splash lubrication scheme to lubricate the bearings associated with each of the shaft assemblies 210, 410, and 420.

In use, the housing 430 may be oriented in an upright configuration such that an exterior surface of the bottom 434 faces in the downward vertical direction and an exterior surface of the top 436 faces in the upward vertical direction. Such an upright configuration is illustrated in FIG. 4.

However, the housing 430 may be oriented in any desired configuration based on operational and/or design considerations.

The input shaft assembly 410 may include an input shaft 452 that is rotatably supported at opposite ends by first and second roller bearings 454, 456. The input shaft 452 may have a rotational axis A2 that is parallel to the vertical direction, and perpendicular to a plane defining the bottom 434 of the housing 430 and/or the earth. In one embodiment, the rotational axis A2 of the input shaft 452 may be parallel to the rotational axis A1 of the solid shaft 240. The input shaft 452 may extend in the upward vertical direction through an opening 458 in the top 436 of the housing 430 and connect to a drive shaft 460 of a motor 462 mounted to the exterior of the gearbox 400. Accordingly, the input shaft 452 may receive rotational power from the drive shaft 460.

The input shaft assembly 410 may further include an input gear 464 arranged about the input shaft 452 and configured to rotate together with the input shaft 452. The input gear 464 may be welded, splined, keyed, and/or press fitted onto the input shaft 452. Alternatively, the input gear 464 may be an integral portion of the input shaft 452 such that the input gear 464 and the input shaft 452 are formed in one piece. The input gear 464 may have a plurality of teeth (not illustrated) that meshingly engage a gear associated with the idler shaft assembly 420. The ratio of the number of teeth of the gear 464 to the number of teeth of the gear 250 may determine the angular velocity of the input shaft 454 relative to the solid shaft 240.

The idler shaft assembly 420 may include an idler shaft 472 that is rotatably supported at opposite ends by first and second roller bearings 474, 476. The idler shaft 472 may have a rotational axis A3 that is parallel to the vertical direction, and perpendicular to a plane defining the bottom 434 of the housing 430 and/or the earth. In one embodiment, the rotational axis A3 of the input idler shaft 472 may be parallel to the rotational axes A1 and A2.

The idler shaft assembly 420 may further include a first idler gear 477 arranged about the idler shaft 472 and a second idler gear 478 arranged about the idler shaft 472. The first and second idler gears 477, 478 may be configured to rotate together with the idler shaft 472. The first and/or second idler gears 477, 478 may be welded, splined, keyed, and/or press fitted onto the idler shaft 472. Alternatively, the first and/or second idler gears 477, 478 may be an integral portion of the idler shaft 472 such that the first and/or second idler gears 477, 478 and the idler shaft 472 are formed in one piece. The first idler gear 477 may have a plurality of teeth (not illustrated) that meshingly engage the input gear 464, and the second idler gear 478 may have a plurality of teeth (not illustrated) that meshingly engage the output gear 280. Accordingly, first and second idler gears 477, 478 may transfer rotation from the input gear 464 to the output gear 250.

The roller bearings 260, 270, 454, 456, 474, 476 may all be lubricated by the same lubrication system. A pump 480 that is powered by the input shaft 452 and submerged in lubricant reservoir 442 may feed the lubricant 444 to the second roller bearings 270, 456, 476 located near the top 436 of the housing 430. After lubricating the second roller bearings 270, 456, 476, the lubricant 444 may fall and/or secrete under the pull of gravity into the lubricant reservoir 442. The first roller bearing 260, 254, 272 may be submerged in the lubricant 444 that collects in the lubricant reservoir 442.

While the input shaft 452 of the present embodiment is disclosed as having a rotational axis A2 that is parallel to the rotational axis A1 of the solid shaft 240 (i.e., the output shaft), other embodiments could be arranged differently, e.g., with the rotational axis A2 of the input shaft 452 being orthogonal to the rotational axis A1 of the solid shaft 240, or with the rotational axis A2 of the input shaft 452 having any other non-parallel orientation relative to the rotational axis A1 of the solid shaft 240.

A method of assembling the gearbox 400 will now be described. The housing 430 may be formed in two halves that can be separated to facilitate the assembly process. Initially, the first and second annular sealing members 298, 300 may be arranged in their respective annular grooves 302, 304 in the inner wall 232. Next, the tube 290 may be introduced (e.g., press fitted) into the opening 230 so that an interference fit is formed between the tube 290 and the inner wall 232 of the opening 230. Then, the idler shaft assembly 420 may be arranged inside the housing 430. Next, the input gear 464 and the gear 250 may be arranged inside the housing 430 with their teeth meshingly engaging the teeth of the first and second idler gears 477, 478, respectively. Next, the input shaft 452 may be inserted through the opening 458 and the input gear 464. The input shaft 452 subsequently may be welded to the input gear 464. Then, the solid shaft 240 may be inserted through the opening 230, the tube 290, and the gear 250. The solid shaft 240 may then be welded to the gear 250. As discussed above, the tube 290 may be arranged about and spaced from the solid shaft 240 so that the dry well is defined between the tube 290 and the solid shaft 240.

While the foregoing method involves a certain sequence of steps for assembling the gearbox 400, the present disclosure is not limited to this sequence. In some embodiments, for example, the tube 290 may be pressed fitted into the opening 230 after the solid shaft 240 has been inserted through the opening 230. This may entail sliding the tube 290 over the solid shaft 240 while simultaneously press fitting the tube 290 into the opening 230.

From the foregoing, it can be seen that the present disclosure advantageously provides an improved configuration and method of assembling a dry well shaft assembly. By arranging a bearing mount about the dry well tube and connecting it to the underside of a gear associated with the shaft, it is possible to construct the shaft as a single, solid structure instead of a two-piece welded structure including a hollow outer portion and a solid inner portion. The one-piece shaft enabled by the presently disclosed shaft assembly may be easier to manufacture and maintain, and stronger, than the two-piece welded shaft required by a conventional dry well shaft assembly. Furthermore, the presently disclosed shaft assembly provides a more robust seal at the interface between the dry well tube and the opening in the housing by utilizing one or more annular sealing members such as O-rings.

While the present disclosure has been described with respect to certain embodiments, it will be understood that variations may be made thereto that are still within the scope of the appended claims.

What is claimed is:
1. A shaft assembly comprising:
  a housing having an opening and an inner wall surrounding the opening;
  a lubricant reservoir within the housing;
  a tubular member having a first end fixed to the inner wall and a second end spaced from the first end to be positioned above a surface of a lubricant that collects in the lubricant reservoir during operation;

a single piece solid shaft extending through the tubular member and having an outer diameter that is smaller than an inner diameter of the tubular member, thereby defining a dry well between the solid shaft and the tubular member;
a gear arranged about the solid shaft and configured to rotate together with the solid shaft;
first and second bearings arranged on opposite sides of the gear and configured to rotatably support the solid shaft; and
a bearing mount fixed to the gear and arranged about the tubular member, the bearing mount having an outer circumferential surface contacting the first bearing and an axial end surface contacting the gear.

2. The shaft assembly of claim 1, comprising:
the first bearing having a first inner race, a first outer race, and a first rolling element between the first inner race and the first outer race, the first inner race contacting the outer circumferential surface of the bearing mount; and
the second bearing having a second inner race, a second outer race, and a second rolling element between the second inner race and the second outer race, the second inner race contacting an outer circumferential surface of the solid shaft.

3. The shaft assembly of claim 1, wherein the first end of the tubular member is directly fixed to and in contact with the inner wall surrounding the opening of the housing.

4. The shaft assembly of claim 1, the tubular member and the inner wall of the opening of the housing forming an interference fit.

5. The shaft assembly of claim 1, the solid shaft having an annular protrusion clamped between the bearing mount and the gear.

6. The shaft assembly of claim 5, comprising:
at least one annular groove formed in the inner wall surrounding the opening; and
at least one sealing member arranged in the at least one annular groove and sealingly engaging an outer circumferential surface of the tubular member.

7. The shaft assembly of claim 1, comprising a plurality of fasteners removably connecting the bearing mount to the gear.

8. The shaft assembly of claim 2, comprising:
the housing having a threaded opening; and
a threaded bushing threadably engaging the threaded opening, and having an annular flange that exerts a preload on the second outer race or is spaced apart from the second outer race by a distance.

9. A gearbox comprising:
a housing having a first opening, a second opening, and an inner wall surrounding the first opening;
a lubricant reservoir within the housing;
a tubular member having a first end fixed to the inner wall and a second end spaced apart from the first end to be positioned above a surface of a lubricant that collects in the lubricant reservoir during operation;
a single piece solid output shaft extending through the tubular member and having an outer diameter that is smaller than an inner diameter of the tubular member, thereby defining a dry well between the solid output shaft and the tubular member;
an output gear arranged about the solid output shaft and configured to rotate together with the solid output shaft;
first and second bearings arranged on opposite sides of the output gear and configured to rotatably support the solid output shaft;
a bearing mount fixed to the gear and arranged about the tubular member, the bearing mount having an outer circumferential surface contacting the first bearing and an axial end surface contacting the output gear;
an input shaft extending into the housing through the second opening; and
an input gear arranged about the input shaft and configured to rotate together with the input shaft, the input gear being operatively connected to the output gear.

10. The gearbox of claim 9, a rotational axis of the solid output shaft being parallel to a rotational axis of the input shaft.

11. The gearbox of claim 9, comprising:
the first bearing having a first inner race, a first outer race, and a first rolling element between the first inner race and the first outer race, the first inner race contacting the outer circumferential surface of the bearing mount; and
the second bearing having a second inner race, a second outer race, and a second rolling element between the second inner race and the second outer race, the second inner race contacting an outer circumferential surface of the solid output shaft.

12. The gearbox of claim 9, wherein the first end of the tubular member is directly fixed to and in contact with the inner wall surrounding the opening of the housing.

13. The gearbox of claim 9, the tubular member and the inner wall of the first opening of the housing forming an interference fit.

14. The gearbox of claim 9, the solid output shaft having an annular protrusion clamped between the bearing mount and the output gear.

15. The gearbox of claim 14, comprising:
at least one annular groove formed in the inner wall surrounding the first opening; and
at least one sealing member arranged in the at least one annular groove and sealingly engaging an outer circumferential surface of the tubular member.

16. The gearbox of claim 9, comprising a plurality of fasteners removably connecting the bearing mount to the output gear.

17. The gearbox of claim 9, comprising an idler gear configured to transfer rotation from the input shaft to the solid output shaft.

18. A method of assembling a gearbox, the method comprising:
providing a housing having a first opening, a second opening, an inner wall surrounding the first opening;
introducing a tubular member into the first opening so that an interference fit is formed between the tubular member and the inner wall surrounding the first opening;
arranging a single piece solid output shaft, an output gear, a first bearing, a second bearing, and a bearing mount inside the housing, the first and second bearings being arranged on opposite sides of the output gear, an outer circumferential surface of the bearing mount contacting an inner race of the first bearing, the tubular member being arranged about and spaced from the solid output shaft such that a dry well is defined between the tubular member and the solid output shaft; and
removably fastening the bearing mount to an underside of the output gear.

19. The method of claim 18, comprising inserting an input shaft through the second opening.

20. The method of claim 18, providing the inner wall with at least one annular groove and arranging at least one O-ring in the annular groove before press fitting the tubular member into the first opening.

21. The method of claim 18, comprising inserting the solid output shaft through the first opening and the tubular member after the tubular member has been press fitted into the first opening.

22. The shaft assembly of claim 1, wherein the gear is directly connected to, and directly drives the solid shaft.

23. The shaft assembly of claim 22, wherein the gear is keyed to the solid shaft with a key joint.

* * * * *